United States Patent [19]
Massie

[11] 3,846,682
[45] Nov. 5, 1974

[54] SEALED PUMP AND DRIVE CIRCUITS THEREFOR

[76] Inventor: Philip E. Massie, 4220 Irving Pl., Culver City, Calif. 90230

[22] Filed: Nov. 20, 1972

[21] Appl. No.: 308,044

Related U.S. Application Data
[62] Division of Ser. No. 113,321, Feb. 8, 1971.

[52] U.S. Cl. .................. 318/138, 310/31, 310/34, 318/134
[51] Int. Cl. ............................................ H02r 5/40
[58] Field of Search ........... 318/131, 132, 133, 134, 318/135, 138; 310/31, 32, 33, 34

[56] References Cited
UNITED STATES PATENTS

| | | | |
|---|---|---|---|
| 2,182,014 | 12/1939 | Clark | 318/132 |
| 2,447,230 | 8/1948 | Brown | 310/32 |
| 2,568,757 | 9/1951 | Mesh | 318/132 |
| 2,686,280 | 8/1954 | Strong et al. | 318/133 X |
| 2,701,331 | 2/1955 | Holst | 310/134 X |
| 3,238,525 | 3/1966 | Humphreys et al. | 318/34 X |
| 3,250,066 | 5/1966 | Englehardt et al. | 310/32 X |
| 3,293,516 | 12/1966 | Marin et al. | 318/132 X |
| 3,321,688 | 5/1967 | Von Delden | 318/158 |
| 3,359,437 | 12/1967 | Massie | 310/32 |
| 3,373,328 | 3/1968 | Hobo | 318/254 |

Primary Examiner—G. R. Simmons
Attorney, Agent, or Firm—Herzig & Walsh

[57] ABSTRACT

A completely sealed magnetically driven pump having a piston armature driven by electrical windings. Unique electrical driving circuits are provided for the pump embodying feedback windings magnetically coupled with the driving windings of the pump for controlling the reciprocation. The drive circuits are such as to facilitate driving rates.

10 Claims, 12 Drawing Figures

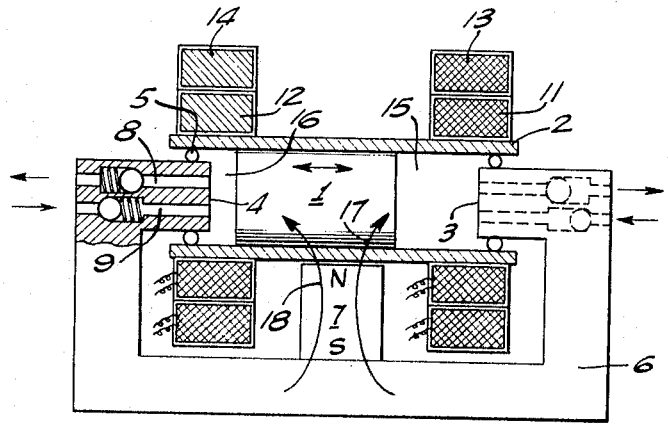
FIG. 1.
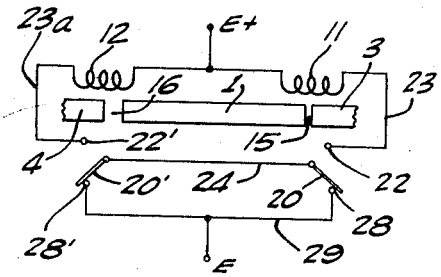
FIG. 2a.
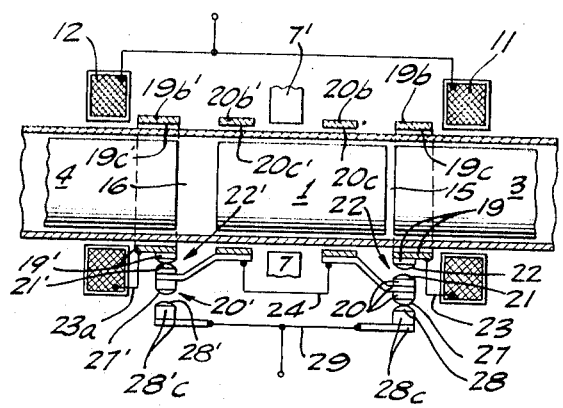
FIG. 2.
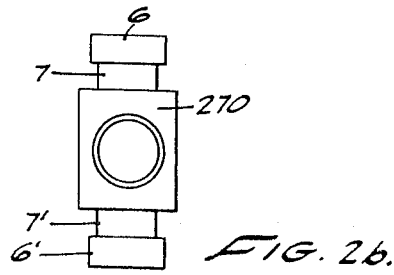
FIG. 2b.
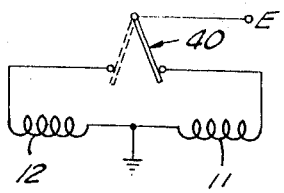
FIG. 3.
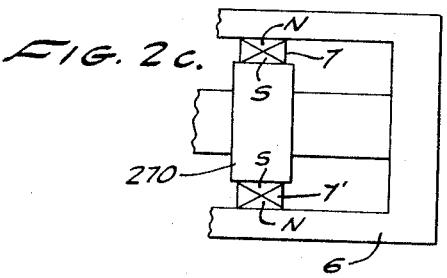
FIG. 2c.
FIG. 6.

SEALED PUMP AND DRIVE CIRCUITS THEREFOR

This application is a division of copending U.S. application Ser. No. 113,321 filed on Feb. 8, 1971.

SUMMARY OF THE INVENTION

The invention is a completely sealed electromagnetically driven pump. The need for a sealed pump is emphasized by the many forms of flexible tube roller pumps and vibrating diaphragm pumps on the market. The limitations of crank-driven piston pumps are well known and include: seal problems around rotating shafts, bearings, mass balance problems, belt or coupling means, and the necessity of including a driving motor of some form with the attendant efficiency reduction and maintenance requirements. The three step conversion of energy in a motor driven piston pump, electricity to rotating pulley to belt to reciprocating piston, shows the large number of opportunities for energy losses, maintenance requirements, and production cost. Associated with the device is the possibility of escape of noxious, corrosive, or lethal materials through the fenestrations of the pump house for shafts and controls.

The flexible tube and roller pump and the diaphragm pump minimize the leakage problem up to the point where the flexible materials fails from fatigue or overpressure.

The herein described pump minimizes or eliminates most of these problems and achieves objects described more fully in the above-referred to application which is incorporated herein by reference.

The pump is electrically (magnetically) driven, and this application is directed primarily to electrical drive circuits. The herein pump offers the following salient advantageous features.

The pump can be made pressure limiting by design of the input power circuit, and the pressure limit can be varied by change of the input voltage to a given pump.

The pump can be made to operate on a "single pulse" basis with no power consumed between pulses. Thus, two or more pumps, operated by suitable proportioning pulse logic circuits can be made into a proportioning assembly.

The basic pump is DC operated, but suitable operating controls described below make the pump usable on AC sources. The pump, in one specific mechanical size and configuration, can be designed for a broad variety of operating voltages by a change in the pump coil design. Since these coils are "bobbin wound" and separate parts, it is entirely practical to disassemble the pump, slip off the coils, and replace them with coils designed for a different operating voltage. Control circuitry can be modified for the new operating voltage.

A basic characteristic and advantage of the pump as referred to is that operation requires merely control of the windings. Another object of the invention is to provide automatic, magnetically-actuated switching or contact means associated with the magnetic fields of the windings for operating the pump. The windings of the pump are adapted for control from different types of electrical power or feed circuitry. Embraced within the invention are concepts of controlling and/or driving the pump from particular electrical circuits which combine in them certain windings associated with the pump itself which form feedback windings magnetically associated with the drive windings of the pump. In one such form of the invention, the driving circuit is a modified Eccles-Jordan circuit embodying feedback windings which are in the form of windings magnetically coupled to the drive windings of the pump. A further object of the invention is to realize this type of electrical drive capability of the pump.

Another object of the invention is to take advantage of the peculiar capabilities of that type of circuitry known as SSR's in the drive of the pump. In one form of the invention, the pump is driven by circuitry constituted by dual SSR's embodying feedback windings which are again windings coupled to drive windings of the pump. The object is to gain the advantages of this type of circuitry in an unique way of coupling the feedback windings to the drive windings of the pump.

A further object of the invention is to realize a device of this type having a reversible capability; that is, it can be designed as an electrically driven pump or, on the other hand, as a mechanically driven electrical generator.

BRIEF DESCRIPTION OF THE DRAWINGS

Further objects and additional advantages of the invention will become apparent from the following detailed description and annexed drawings, wherein:

FIG. 1 is a cross sectional view of a basic form of the pump;

FIG. 2 is a schematic view illustrating magnetic switching control of the windings of the pump;

FIG. 2a is a schematic view of the circuitry involved in FIG. 2;

FIG. 2b and 2c are views of the arrangement of FIG. 2;

FIG. 3 is a view of a manually actuable switch for controlling the pump.

FIG. 6 is a circuit diagram of the dual SSR control circuitry for the pump windings.

DESCRIPTION OF THE PREFERRED EMBODIMENT

Figure 5:
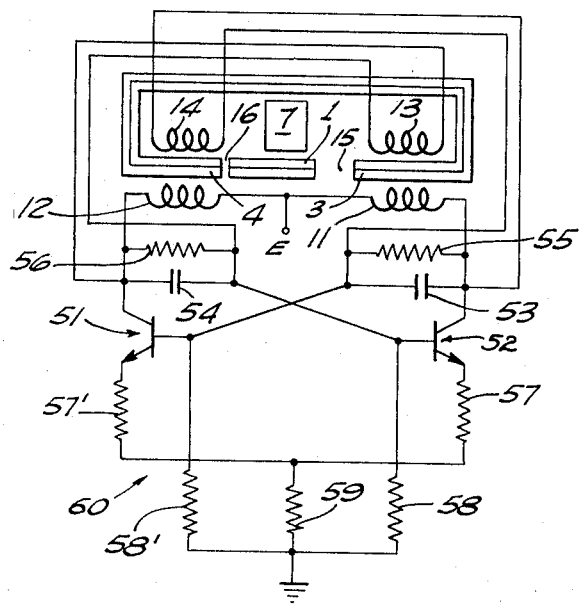
FIG. 5 is a circuit diagram of a modified multivibrator circuit with feedback windings.

The pump in basic form is shown in FIG. 1. The mechanical parts of the pump consist of: piston/armature 1 of ferromagnetic material; cylinder 2 of nonmagnetic material; two cylinder head/pole pieces 3 and 4 of ferromagnetic material; magnetic core (back iron) material 6 that magnetically connects the two pole pieces; permanent magnet 7 properly interposed to couple the armature/piston to the magnetic core; and suitable seals 5 between the cylinder and the cylinder head/pole pieces. Assembly means may take any desirable configuration, such as tension rods to cross bars on the outside of the pole pieces to pull the assembly together or screw threads between the cylinder and the cylinder head, including tapered pipe threads, screwed together with plumbers pipe dope. The pole pieces and the back iron are not necessarily one part, preferably not, for reasons to be explained below.

The electrical portion of the basic pump consists of coils 11 and 12 which drive the pump. These coils are actually wound around the cylinder and preferably cover air gaps 15 and 16 that constitute the pump displacement. Coils 13 and 14 are not power coils, and their function will be explained later.

The cylinder head/pole pieces of the pump contain inlet and outlet ports 8 and 9 to admit and release the pumped material. Suitable valves of any type, i.e., reed, plug, flapper, or ball valves are applicable. The valves are spring loaded, pressure operated in response to pressure differentials across the valves. The valves are of non-magnetic material to minimize sticking due to magnetic forces. (There may be a state of operation where ferromagnetic valves are desirable, particularly inlet valve 9.)

The pump operates in the following manner. The permanent magnet supplies a magnetic flux to piston/armature 1 through non-magnetic cylinder wall 2. Two paths exist for the magnetic flux through two pole pieces 3 and 4. The magnetic flux divides between two paths 17 and 18. The division of the flux between 17 and 18 is a function of the relative permeance of each circuit. Permeance is that function which relates to the ease with which magnetic flux passes through a circuit under the influence of a given magnetomotive force, $P=\phi/F$. (Units used in magnetic design are strange and wonderful to behold. There are three different systems of units, two of which are in common use in the United States. An explanation of these two is in order here.

A. Mixed English units are based on the inch system.

1. Flux is expressed in lines per square inch or maxwells.
2. Magnetomotive force is expressed in ampere turns per inch.
3. The permeability of a vacuum is 3.192 in this system.

B. C.G.S. units are metric based.
1. Flux is expressed gausses.
2. Magnetomotive force is expressed in oersteds.
3. The permeability of a vacuum is 1 in this system. The ratio between the two systems is conversion from inches to centimeters, with exceptions. Mixed English units will be used herein.)

Figure 4:
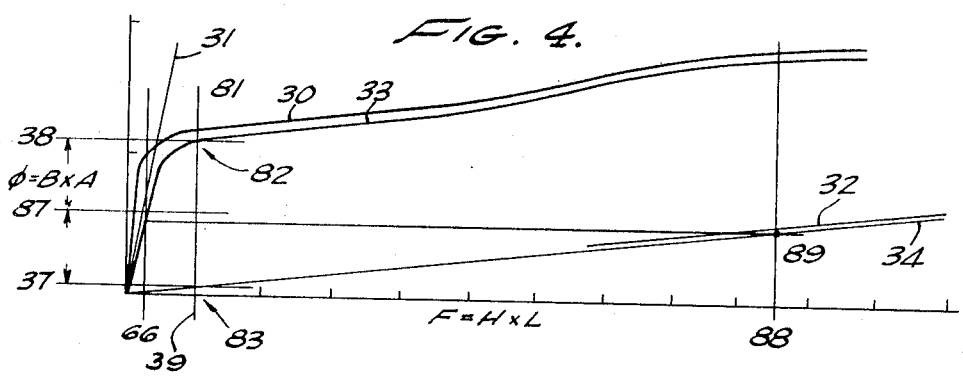
FIG. 4 is a graph of magnetization curves associated with the pump of FIG. 1.
Figure 4A:
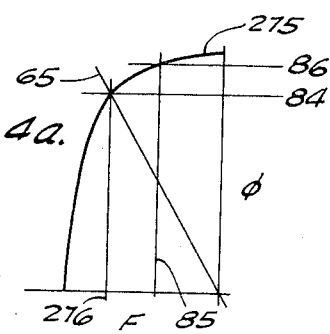
FIG. 4a is a graph of a demagnetization curve of a permanent magnet.

FIG. 4 shows the magnetization curve. The ordinate is flux in lines (maxwells) for the particular circuit. Kilolines is the generally used term because of the large numerical values. The abscissa is magnetomotive force in ampere turns. The magnetization curve for a specific magnetic circuit is developed in parts. One-half the ferromagnetic material (one side of the pump) is represented by curve 30 showing the high permeability of the ferromagnetic material up to the knee of the curve, called saturation. The magnetization curve of an air gap is a straight line. The slope of the line is proportional to the area divided by the length of the air gap. Line 31 represents a short air gap (closed gap) such as 16 in FIG. 1, with a relatively high permeance. Line 32 represents a long air gap (open gap) such as 15 in FIG. 1 with a relatively low permeance. The total magnetization curve for the two sides of the pump is represented by line 33 for the closed gap plus the iron and line 34 for the open gap plus the iron. These curves are developed by summing the magnetomotive force for a given flux quantity. Line 39 represents the external magnetomotive force of the permanent magnet under a specific condition. FIG. 4a shows the internal demagnetization curve of a permanent magnet of a specific size. The permeance of the total external magnetic circuit is represented by line 65. The intersection of this line with demagnetization curve 275 defines MMF 276 and flux 84, the permanent magnet will develop in the external circuit. MMF 276 of FIG. 4a is the inverse of MMF 39 of FIG. 4. Flux 38 in the closed gap circuit is found at intersection 82 of lines 39 and 33 (FIG. 4). Flux 37 in the open air gap circuit is found at intersection 83 of lines 39 and 34 of FIG. 4. The sum of the two fluxes 37 and 38 of FIG. 4 is equal to flux 84 in FIG. 4a. It can be seen that there is a large difference between the flux in the closed air gap circuit 16 of FIG. 1 and open air gap circuit 17. The mechanical force in pounds in an air gap is equal to $\phi^2/72A$, where $\phi$ is in kilolines and A is the effective gap in square inches, allowing for air gap fringing which increases the area. The net force on the piston is the difference between the two force values. Thus, it is apparent that a large differential force exists to hold the piston in the closed gap position, since most of the flux flows in that gap. No external power is required to hold the piston in this position. This covers the static or starting position of the pump.

With respect to the operation of the pump, if a voltage is applied to coil 11 in such a direction as to aid (increase) the flux in the open gap, flux will be diverted to that gap 15 of FIG. 1. This will tend to pass more flux through the permanent magnet and reduce the magnetomotive force of the magnet along lines 275 of FIG. 4a. Thus flux of the permanent magnet moves from line 84 to line 86 as the magnetomotive force moves from lines 276 to line 85. The effect of the decrease in permanent magnet MMF is to decrease the flux in air gap 16, curve 33 of FIG. 4. The addition of an electrical MMF is to impress a high MMF on open air gap 15. This produces an increase in flux along line 34 of FIG. 4 while the flux in the closed gap decreases along line 33 of FIG. 4 to a level where the greater amount of flux is in the open air gap. At this point, the balance of force is shifted in accordance with the force equation, and the piston starts to move to close gap 15.

With the constant value of electric MMF, the flux in open gap 15 increases with movement of piston 1. At the same time, the flux in the closed gap decreases. This produces an increasing force to move the piston to close gap 15. As the gap closes, the movement of the piston reduces the volume in gap 15 and displaces any material out through outlet port 8. The pump has completed one pumping stroke. As gap 15 decreases in volume, gap 16 increases in volume, drawing material in for the next pumping stroke.

If power is now removed from coil 11 and applied to coil 12, the same action takes place; and the piston displaces the material drawn into gap 16 and draws more material into gap 15, ready for the next pump stroke. The pump has now completed one cycle, two pumping strokes.

Alternate application of a voltage to coils 11 and 12 will cause the piston to move from one pole piece 3 to the other 4. In the process, the piston alternately increases and decreases the volume of air gaps 15 and 16, thus drawing material in through inlet port 9 and exelling material through outlet port 8, controlled by the logic of normal spring-loaded valves. To establish means of generating the voltage on alternate coils 11 and 12, a 60 hertz constant volume pump may be used. It is possible to design the magnetic and electric circuits to operate on the positive and negative half cycles of a 60 cycle power source. Coils 11 and 12 are connected so that current through the corresponding diodes will generate a flux to aid flux 17 or 18 in the corresponding coil. This is a highly limited application. The utility of this type of operation can be extended by using a variable frequency AC power source, such as a transistor inverter for driving the unit.

If single shot manual operation is desired, a manual spring-loaded, single-pole, double-throw switch 40 will suffice, as in FIG. 3. The switch is spring loaded in the center position with neither position connected. The switch is manually pushed from one contact to the other, and the pump will respond with one stroke per switch contact. This might be a desirable method for laboratory test application where precise pressure or air quantities are desired.

A method of automatic lever switch operation is shown in FIG. 2. Spring 20 is a ferromagnetic and conductive leaf spring carrying back side contact 27 and front side contact 21. A similar spring is installed in relation to air gap 16. Referring to the magnetization curves of FIG. 4, curve 30 is the magnetization curve of the iron only. Curve 32 is the magnetization curve of the open air gap. The two combine into curve 34. At the flux level 37, it can be seen that most of the magnetomotive force is across air gap 16. Now with reed switch 20' close to piston 1 (separated only by the non-magnetic cylinder 2) as compared to the spacing between armature 1 and pole face 3 (air gap 15) and with a similar magnetic material 19 supporting a contact 22 in close proximity to pole face 3, it is seen that a high MMF will be impressed across magnetic circuit 1, 20', 19', 4. This will produce a corresponding high flux in the air gap between 19' and 20'; diverting flux from air gap 16. An equation can be used to design a sufficient force to move reed spring 20', open contacts 27' and 28', and close contacts 21' and 22'. From FIG. 2a, it is seen that this will place power on coil 12 through leads 24 and 29 and contacts 28 and 27, moving the piston to close gap 16. As gap 15 opens, the magnetization curve shifts along line 39 (with deviations) to the intersection with line 34, which is now the curve for gap 15 (the open gap). At the point, contacts 27 and 28 are opened, removing power from lead 23a and coil 12. Contacts 21 and 22 are closed by the large MMF across gap 15. As gap 16 is closed, the MMF moves to the intersection of line 39, the permanent magnet MMF, and line 33, closed gap. Since the MMF across gap 16 is now small and with appreciable air gaps in the reed switch magnetic circuit at the two penetrations of tube wall 2, reed switch 20' will move and close contacts 27' and 28' and complete the power circuit to lead 23 and coil 11. This will move the piston back to close gap 15, and the cycle will continue.

During the interval that contacts 21, 22 and 21' 22' are both closed with gap 16 closing, the change of flux in coil 12 due to movement of the piston will be such as to produce a current in coil 11 which reduces the flux in gap 15. This will keep the MMF across gap 15 reduced but not low until the piston stops moving, and there is no further change of flux and corresponding induced voltage in coil 12.

Mounting rings 19b, 19b', and 20b' support the various contacts and increase the area of air gap 19c, 20c between the magnetic portions of the reed switch parts and the pole pieces and the piston/armature. This reduces the reluctance (increases the permeance) of the air gaps and allows more magnetic flux to flow through the reed switch magnetic circuit at any point in the operation. This is typical and not the only method of support of the reed switch contacts. Coils 11, 12, 13, and 14 can be placed at any point on the iron circuit (around the "loop") as long as the coils enclose all the circuit cross section. The preferred location is along some portion of the pole piece/piston region to minimize leakage flux.

Permanent magnet material is hard and difficult to cut or machine. Since cast bars are more efficient than similar material pressed and sintered from powder, it is desirable to use flatsided magnet sections. This does not adapt well to the round configuration of the center of the pump.

Further, the energy obtainable from a magnet is a function of cross sectional area and length in relation to the external magnetic circuit. The external magnetic circuit has a permeance characteristic of the cross section and the length of the various elements. It is desired to operate the external magnetic circuit at a given flux (flux density times area at the critical point— in this case, working air gaps 15 and 16). The required cross sectional area of the permanent magnet is selected to provide the desired flux when operated at the optimum point. The length of the magnet is selected to provide the required MMF to force the flux through the external circuit, again operating at the optimum point on curve 275 (FIG. 4a). It is now apparent that the dimensions of the permanent magnet may be entirely independent of all of the other parameters of the magnetic system, i.e., coil cross section, central tube diameter, etc.

For the above reasons, it is often desirable to provide "coupling" of the permanent magnet to the iron circuit by a shoe 270 as shown in FIGS. 2b and 2c. The permanant magnet is designated at 7. This is usually a material more adapted to machining operations and much cheaper than permanent magnet material. The designer is now free to design his permanent magnet in any desired configuration. It may be one or more magnets in parallel, as sown in FIG. 2b, or it may be one magnet only. The pump design may be such as to have only one "external leg" and thus, a position for only one permanent magnet. The core is designated at 6 and 6'. The permanent magnet should be close to the "iron" in all cases. The use or omission of a shoe is optional with the design.

DRIVE CIRCUITS

FIG. 5 shows the operation of the pump on a modified-semiconductor, free running switching circuit. A free running (astable) multivibrator 60, commonly known as the Eccles-Jordan circuit, contains semiconductor (transistor) switches 51 and 52. The timing circuits consisting of resistor/capacitor circuits 53/55 and 54/56 are designed to turn on switches 51 and 52 alternately. The load on the switches consists of pump coils 11 and 12. The rest of resistors 57, 57', 58, 58', and 59 in the circuit are typical of this configuration of a multivibrator (flip-flop). The circuit of FIG.

5 will be considered in some detail in relation to its feedback implications.

When switch 51 is on, resistance 55 and capacitor 53 are designed so that sufficient base current is supplied to switch 51 through the capacitor but not through the resistor. Switch 52 is off, and the collector is at a high potential since no current flows through the circuit. Capacitor 53 charges from the high potential at a time constant determined by resistor 55, the base bias resistors of switch 51 and the resistance of the base to collector junction of switch 51. When capacitor 53 is charged to the potential of the collector of switch 52, no further current flows through the capacitor. This reduces the current through the base of switch 51 and correspondingly reduces the current through switch 51. This reduction in current in switch 51 causes a rise in potential of the collector of switch 51. This rise in potential causes capacitor 54 to start charging and supplying current to the base of switch 52. This in turn causes current to start flowing in switch 52 and reduces the collector voltage, further reducing the base current to switch 51. This feedback continues until switch 51 turns off and switch 52 is on. Since capacitor 53 was charged to a high potential prior to the switch and cannot rapidly discharge when the collector of switch 52 drops in potential, the base of switch 51 is driven hard off (positive as shown) and fully cuts off switch 51. The cycle now repeats in the opposite direction.

It will be noted that the leads on the two switches are operating coils 11 and 12 of the pump. Thus, the coils are powered alternately and cause the pump to operate.

This circuit is designed to operate from direct current. It can be designed to operate over a wide range of voltage levels. The limit on power capability is the current carrying capacity of switches 51 and 52. Transistors (as shown) now are available with very significant voltage ratings and power capabilities. Operation in a saturated switching mode, such as this, increases the current carrying capability of the switches. NPN transistors are shown, but PNP transistors are equally applicable. If greater power is required or higher voltages are available, the circuit can be converted to use silicon-controlled rectifiers (SCR). Additional components are required to turn the SCR switches off, but circuits of this nature are available in most handbooks on SCR operation.

A typical Eccles-Jordan astable multivibrator circuit operates at a fixed frequency established by the time constants of the passive components of the circuit. It is possible to add feedback coils to the pump which will speed up operation of the multivibrator as a function of the pump air gap closure and to modify such circuit to include the feedback coils. In FIG. 5 are shown the pump and astable multivibrator with the addition of feedback coils 13 and 14 to the pump. These coils are magnetically coupled to the power coils and sense the flux (not current) changes therein (see FIG. 1). When switch 51 is on and supplying power to move the piston to close gap 16, capacitor 53 is charging at some rate toward a value that will turn off switch 51. Now, it is desirable to switch the feedback multivibrator 60 when the piston reaches the end of travel. Coil 14 is so connected that the large change of flux with respect to time at the end of travel ($d\phi/dt$) will induce a voltage in coil 14 such as charge capacitor 53 at a higher rate than the normal power circuit. Now coil 14 tends to receive a voltage "spike" near the end of piston travel due to the increasing rate of flux change with respect to piston movement and the increasing acceleration on the piston with the increased flux and resultant force. This voltage spike can be adjusted to charge capacitor 53 very rapidly near the end of piston travel, thus decreasing the effective time constant of the circuit and hastening the switch time of switch 51. This feedback circuit speeds up operation of the pump by making the multivibrator switch as the piston reaches the end of travel instead of waiting for the full time constant of the MV circuit.

The lower part of the network of FIG. 5 is simply that part of an Eccles-Jordan circuit. The semiconductor-operated circuit is highly desirable for power requirements from miniscule to moderate. Where AC power only is available, a simple rectifier or transformer/rectifier circuit with moderate filtering will supply the required DC.

Figure 5A:
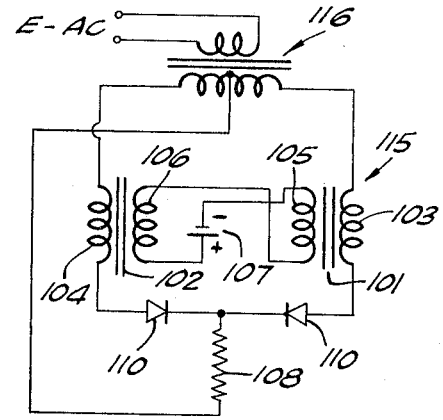
FIG. 5a is a circuit diagram of a component of the circuit of FIG. 6.

One class of magnetic core amplifying devices is called by a variety of names. The term self-saturating reactor (SSR) will be used. The "direct current" form of SSR unit operates on AC and provides a pulsating DC to the load. Two common types are the center tap SSR and the bridge SSR. FIG. 5a shows a center tap SSR. The basic circuit consists of two magnetic cores 101 and 102 which may be interconnected magnetically so as to look like one core. AC power is supplied through a center tapped transformer 116. Each SSR core has a load-carrying winding, commonly called gate winding 103 and 104, and a control winding 105 and 106. An AC supply is connected across gate windings 103 and 104 in series with a load 108. Two rectifiers 110 cause the SSR to pass pulsating DC through load 108. The inductance of a coil wound on a ferromagnetic core is well known as an impedance to the flow of alternating current. Thus within the limits of the core and coil design, the two gate windings act to limit the flow of current in the load to that small amount known as exciting current necessary to supply the core excitation. Referring to FIG. 4, if the core is operating on line 30 for ferromagnetic material and operating below the knee of the curve (saturation), the flux in the core (instantaneous and varying value) is proportional to the voltage across the winding. The current through the coil is proportional to the magnetizing force expressed in ampere turns. It can be seen that the current will be very small for core operation below saturation. With the core windings conncted as shown in FIG. 5a, each gate windings limits the current on one-half cycle of the alternating voltage, one gate limiting the "positive" half cycle, the other limiting the "negative" half cycle.

Referring to the control windings on cores 105 and 106, these windings are connected in series and are powered by a DC power source 107. The DC source can be varied in magnitude, varying the current through the control windings. (All devices in this class of magnetic core amplifiers are current control and limiting devices as compared to voltage control of vacuum tubes.) If a small amount of DC is passed through control windings 105 and 106 of the two cores, the ampere turns of the control winding will cause the magnetic flux of the cores to move up on magnetization curve 30 to some level such as 87 shown in FIG. 4. If the alternating voltage is now impressed on the gate windings, the total flux in the core will be the sum of that produced by the control winding and the peak value of one-half cycle of AC. This flux will reach a value such that the core passes over the knee of the magnetization curve. At that point, the alternating voltage supply can push a large amount of current through the gate windings since a small change in flux is caused by a large change in ampere turns. The same effect will be repeated in the other core on the next half cycle. Thus, impressing a small amount of DC power on the control windings causes the gate windings to pass some significant amount of AC power during a portion of each half cycle. The portion of the half cycle during which the gate winding conducts is a function of the amount of control winding ampere turns impressed on the core. This is a simplified explanation of the operation. The basic law is that of equal ampere turns in control and gate windings, neglecting the exciting current required for the core.

Series-connected and parallel-connected saturable reactors operate in the same manner. The final results are slightly different. The load has AC passed through it which is a function of the amount of control ampere turns impressed on the two magnetic cores. Control windings 105 and 106, gate windings 103 and 104, magnetic cores 101 and 102, and control DC power supply 107 are similar to the saturable reactor. There are several significant differences.

In the typical operation curve of an SSR, AC or DC type, if no control is supplied, a load current will flow at a particular point on the characteristic curve. To bring the load circuit to minimum output, a reverse bias current must be supplied. The ampere turns for this bias are normally supplied by a separate windings(s) similar to control windings 105 and 106 (FIG. 5a). A constant DC supply to this bias winding will place the operating point of the SSR at the minimum current level. This bias winding is not illustrated. It should be noted that there are many core and coil mechanical configurations for both saturable reactors and SSR's. One form has cores 101 and 102 so placed that control windings 105 and 106 can be replaced by a single winding. Two gate windings 103 and 104 are required. Another version uses the typical transformer E-I core in the form called the three-leg reactor.

A modification of the SSR has an additional winding(s) placed on cores 101 and 102. This is called an extrinsic positive feedback winding (not shown). It can be connected in series or in parallel with load 108. This winding is connected so that when power is applied to the load, ampere turns in the positive feedback windings aid the ampere turns of control windings 105 and 106. This added control increases the power supplied to the load and increases the ampere turns in the winding. The winding can be designed to be of the snap-action type. That is, when power is applied to control windings 105 and 106, the positive feedback winding supplies the increasing ampere turns to move the SSR to full output. The snap-action SSR is a two-state device.

The center tap SSR with DC output as shown in FIG. 5a with positive extrinsic feedback added will produce a snap-action SSR. Bias ampere turns are required from some source. The unique capability of this type of SSR lies in the ability of transformer 116 to change the operating voltage to any desired level. Thus, devices designated to operate from automotive battery voltages can be readily operated from commercial AC line voltages.

FIG. 6 shows the application of the SSR to operation of the pump, i.e., two snap-action SSR's 117a and 117b to drive of a pump. The bridge type SSR's shown have four rectifiers 110. Positive extrinsic feedback windings 111 provide the snap action. Bridge type SSR's are shown, but center tap SSR's are equally applicable. (For detailed description of the SSR, see *Magnetic Amplifiers* by H. F. Storm, John Wiley & Sons, 1955.) The load 108 of each SSR is operating coil 11 or 12 of the pump. A negative feedback winding 120 is added to each SSR. Control windings 105 and 106 and DC supply 107 of each SSR are used as a bias winding and adjusted so that each SSR is on, that is, operating at a point on the upper limb of the control characteristic curve of the SSR. This method of operation is chosen to assure that the SSR multivibrator will start when power is applied. Other methods of operations are possible.

Since the SSR's are snap action, negative feedback ampere turns on either SSR will cause it to snap from the upper limb of its characteristic curve to the lower limb. When power is applied, current will immediately flow in both power coils of pump 11 and 12.

Now assume that SSR 117b and coil 12 are operating on a closed gap 16. The high permeance of the circuit will produce high magnetic coupling between load coil 12 and feedback coil 14. The in-rush current in coil 12 will produce a large transient voltage on coil 14. SSR 117a and coil 11 are operating on an open gap 15. The coupling between coil 11 and feedback coil 13 is low and a minimum pulse will be induced in coil 13. The large pulse in coil 14 will pass readily through capacitor 122 and negative feedback coil 120 on SSR 117a, causing this SSR to snap off. SSR 117a will remain off until capacitor 122 is charged and the current is limited by resistor 121. If this current is properly adjusted, SSR 117a will snap on. In the absence of a negative feedback pulse from coil 14, coil 13 will produce sufficient negative feedback ampere turns in coil 120 on SSR 117b through capacitor 122 to snap off SSR 117b. The current through load coil 108a will move piston 1 and produce a continuing large feedback pulse due to the flux switching described above. This large pulse will rapidly charge capacitor 122 on SSR 117b so that as soon as the flux change stops due to end of piston travel, no added current flows in the negative feedback coil 120 on SSR 117b. This will permit SSR 117b to snap on since that is the normal, quiescent state. Further in the absence of further voltage input from coil 13, capacitor 122 on SSR 117b will discharge in the reverse direction through coil 120 on SSR 117b providing positive feedback to further speed the turn on of SSR 117b. The process becomes fully oscillatory in a repetition of the above cycle.

The normal ultra-high gain SSR used wound tape ferromagnetic cores of high nickel content and special processing to secure maximum gain and linear operation. These are expensive cores. An adequate SSR can be made from E-I transformer laminations of high grade, non-nickel bearing transformer iron. This can be made in the form of a typical three leg reactor. The fabrication of such a reactor lends itself to the mass production, cost competitive techniques used in the manufacture of commercial transformers. The final appearance of each SSR is that of a single unit with a single core and requiring a single mounting means.

Figure 7:
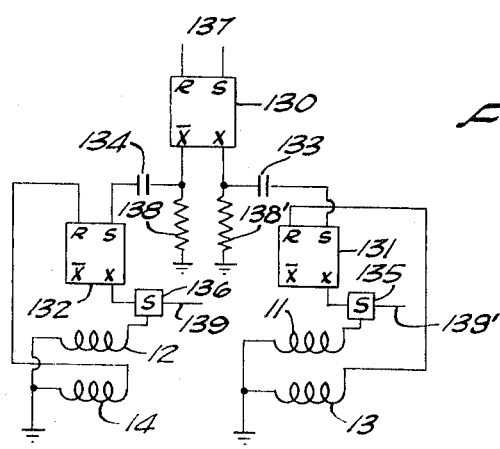
FIG. 7 is a circuit diagram of the binary logic control circuitry for the pump windings.

Two-state circuits of the type commonly known as binary logic can be used to operate the pump, as shown in FIG. 7. A bistable device known as a flip-flop is shown at 130, 131, and 132. The R-S flip-flop is shown, but a type D, type T, or type J-K flip-flop can be used. The R-S flip-flop has the characteristic that if a pulse is applied to the S (set) terminal, a continuous output is developed at the X terminal even after the pulse is removed from S. If a pulse is now applied to the R (reset) terminal, a continuous output is developed at the $\overline{X}$ (not X) terminal. Terminals X and $\overline{X}$ are mutually exclusive. If a driving source alternately applied pulses to terminals R and S of flip-flop 130, pulses will be applied to the S terminals of flip-flops 131 and 132 alternately. The use of capacitors 133 and 134 (with suitable discharging and loading resistors 138 and 138') assure that only pulses reach the set terminal of flip-flops 131 and 132. When a pulse reaches the set terminal of flip-flop 131, a continuous output is developed on X. This output of low power capability is used to operate switch 135 to control power to load coil 11 of the pump. Piston 1 will move to close gap 15. Coil 13 will have an induced pulse generated by the change of flux in the gap, as explained above. This pulse will reach the reset terminal of flip-flop 131 and cause the $\overline{X}$ terminal to be active and the X terminal to be turned off. $\overline{X}$ is not used. When the reset terminal flip-flop 130 is pulsed, the $\overline{X}$ terminal is activated which pulses the set terminal of flip-flop 132. This causes switch 136 to be turned on, and coil 12 operates to move the piston to close gap 16. Coil 14 pulses the reset terminal of flip-flop 132 and turns off power as soon as the gap is closed. Power for coils 11 and 12 is from lines 139 and 139' controlled by switches 135 and 136.

Pulses from some clock source 137 may be used to drive flip-flop 130. The unit may be made free running by coupling the leads from coils 13 and 14 back to 137. This may require some external pulse to generate the first movement of the piston. The prime advantage here is the ready availability and low price of monolithic integrated circuit (IC) flip-flops in small sizes and standard packages. The power switch can be electromechanical relay or semiconductor or other type which is compatible with the output of IC flip-flops.

Computer control of mixing processes is becoming widely used. The logic drive form of the pump lends itself to this system. Since the pump has a constant displacement for each stroke (half cycle), the quantity of a mix component can be varied in a continuous mix process by computer control of the pump rate. A type T flip-flop has a single input and changes the X and $\overline{X}$ state with each pulse on the input. If a type T flip-flop is used at 130, the computer can command the required component flow by timing the pulses to the input. Thus, with a pump for each component which may be used in a variety of mixtures, the computer can accurately and continuously control the mix ratios by proper pulse rate on the logic input of each pump. If the mix ratio of a component varies over a wide range, two parallel pumps of widely different stroke volumes can be used.

Other logic forms are possible to generate the required operating pulses. Variable rate is possible with most of such circuits. Clocked operation is possible with type D and J-K flip-flops. Type J-K is a universal type which will perform the function of all other generally classified flip-flops.

From the foregoing, those skilled in the art will readily understand the nature and construction of the invention and the manner in which it acheives the objects set forth in the foregoing. As a pump, the device is unique in that it is completely sealed and uniquely adapts itself to drive from particular types of electrical control circuits.

While the specific embodiments of the drive circuits disclosed herein are shown as adapted to the drive of a sealed pump, it is to be understood that the electromagnetic drive windings and magnet may be utilized to drive other mechanisms and instrumentalities.

The foregoing disclosure is representative of preferred forms of the invention, preferred forms of drive of the pump, and preferred applications and adaptations of it; and it is to be interrupted in an illustrative rather than a limiting sense, the invention to be accorded the full scope of the claims appended hereto.

What is claimed is:

1. A reciprocating electrical machine comprising: a magnetically actuatable reciprocatable armature and means supporting it for movement; permanent magnet means associated with the armature and supporting means; electrical winding means disposed to produce an electromagnetic field for reciprocating the armature in association with the field of the permanent magnet; and switch means for energizing the windings in a manner to cause the armature to reciprocate, said switch means comprising magnetic reed switch means positioned in proximity to the electromagnetic field generated by the windings so as to be actuable thereby in a manner to cause the armature to reciprocate.

2. A machine as in claim 1, in the form of a sealed pump wherein said supporting means comprises a cylinder, the armature being a piston movable in the cylinder, the ends of the cylinder being closed and the piston being free from mechanical connections to the exterior of the cylinder.

3. A reciprocating electrical machine comprising: a magnetically actuatable reciprocatable armature and means supporting it for movement; permanent magnet means associated with the armature and supporting means; electrical winding means disposed to produce a magnetic field for reciprocating the armature in association with the field of the permanent magnet; and drive circuit means for energizing said windings in a manner to cause said armature to reciprocate, said drive means comprising a multi-vibrator driving circuit for the windings, said windings comprising at least a pair of windings connected as load windings in said multi-vibrator circuit.

4. A machine as in claim 3, wherein said winding means include an additional pair of windings in coupling relationship with said first windings, said additional windings being connected to form feedback circuits in said multi-vibrator circuit whereby to increase the cycling rate of the circuit.

5. A machine as in claim 4, wherein said circuit comprises resistance/capacitance networks, said feedack windings being connected to control the charging rate of said capacitors in said network to thereby control the switching rate of switching in the circuit.

6. A machine as in claim 3, wherein said driving circuit comprises a pair of saturable reactors for supplying power to said winding means, and an additional pair of windings having coupling relationship with said first windings associated with said saturable reactors as feedback windings to control feeding of power to said first winding.

7. A machine as in claim 3, in the form of a sealed pump wherein said support means comprises a cylinder, said armature being in the form of a magnetically actuated piston within the cylinder, the ends of the cylinder being closed and the end of the piston being free from mechanical connections to the exterior of the cylinder.

8. A machine as in claim 6, wherein said saturable reactors have associated extrinsic feedback windings whereby to produce the snap-acting characteristic.

9. A machine as in claim 6, wherein said saturable reactors are of the bridge type.

10. A machine as in claim 6, wherein said saturable reactors are magnetically coupled to each other whereby to alternately supply power to said first windings.

* * * * *